US011771108B2

(12) United States Patent
Lazzarini et al.

(10) Patent No.: US 11,771,108 B2
(45) Date of Patent: Oct. 3, 2023

(54) MACHINE FOR MAKING AND DISPENSING LIQUID OR SEMI-LIQUID FOOD PRODUCTS

(71) Applicant: ALI GROUP S.R.L.—CARPIGIANI, Cernusco sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

(*) Notice: Subject to any disclaimer, the term of this patent is extended or adjusted under 35 U.S.C. 154(b) by 251 days.

(21) Appl. No.: 17/233,448

(22) Filed: Apr. 17, 2021

(65) Prior Publication Data

US 2021/0329939 A1 Oct. 28, 2021

(30) Foreign Application Priority Data

Apr. 28, 2020 (IT) .......................... 102020000009274

(51) Int. Cl.
*A23G 9/12* (2006.01)
*A23G 9/04* (2006.01)
(Continued)

(52) U.S. Cl.
CPC ............... *A23G 9/12* (2013.01); *A23G 9/045* (2013.01); *A23G 9/224* (2013.01); *A23G 9/281* (2013.01);
(Continued)

(58) Field of Classification Search
CPC .......... A23G 9/12; A23G 9/045; A23G 9/224; A23G 9/281; A23G 9/04; B01F 27/091; B01F 35/93
(Continued)

(56) References Cited

U.S. PATENT DOCUMENTS 6,205,806 B1* 3/2001 Huang ..................... A23G 9/12
62/343
6,332,333 B1* 12/2001 Lee ......................... A23G 9/12
366/310
(Continued)

FOREIGN PATENT DOCUMENTS

DE 2151108 A1 4/1972
EP 3127430 A1 2/2017
(Continued)

OTHER PUBLICATIONS

Italian Search Report dated Jan. 13, 2021 from counterpart Italian Patent Application No. 102020000009274.

*Primary Examiner* — Steve S Tanenbaum
(74) *Attorney, Agent, or Firm* — SHUTTLEWORTH & INGERSOLL, PLC; Timothy Klima

(57) ABSTRACT

A machine for making and dispensing liquid or semi-liquid food products, includes, in combination:
a container for containing liquid or semi-liquid products;
a thermal treatment cylinder contained inside the container and having an axis that is inclined relative to the vertical;
a stirrer mounted to the outside of the thermal treatment cylinder;
a thermal system including a heat exchanger associated with the thermal treatment cylinder, wherein the container for containing liquid or semi-liquid products is defined by a first, inside wall and a second, outside wall, the first, inside wall and the second, outside wall forming between them a gap that is not affected by the liquid or semi-liquid products.

11 Claims, 9 Drawing Sheets

(51) Int. Cl.
  *A23G 9/22*    (2006.01)
  *A23G 9/28*    (2006.01)
  *B01F 27/091*  (2022.01)
  *B01F 35/93*   (2022.01)
  *B01F 35/90*   (2022.01)
  *B01F 101/13*  (2022.01)

(52) U.S. Cl.
  CPC ............ *B01F 27/091* (2022.01); *B01F 35/93* (2022.01); *B01F 2035/98* (2022.01); *B01F 2101/13* (2022.01)

(58) Field of Classification Search
  USPC .......................................................... 62/342
  See application file for complete search history.

(56) References Cited

U.S. PATENT DOCUMENTS

| | | |
|---|---|---|
| 2003/0000240 A1 | 1/2003 | Pahl |
| 2005/0126201 A1 | 6/2005 | Navedo et al. |
| 2012/0234035 A1* | 9/2012 | Ugolini ................. A23G 9/045 |
| | | 62/342 |
| 2017/0208833 A1* | 7/2017 | Cocchi ................. B01F 27/074 |

FOREIGN PATENT DOCUMENTS

| | | |
|---|---|---|
| GB | 1362840 A | 8/1974 |
| JP | H10286066 A | 10/1998 |
| WO | 2012119962 A1 | 9/2012 |
| WO | 2013011078 A1 | 1/2013 |
| WO | 2014091393 A1 | 6/2014 |
| WO | 2017221084 A1 | 12/2017 |

\* cited by examiner

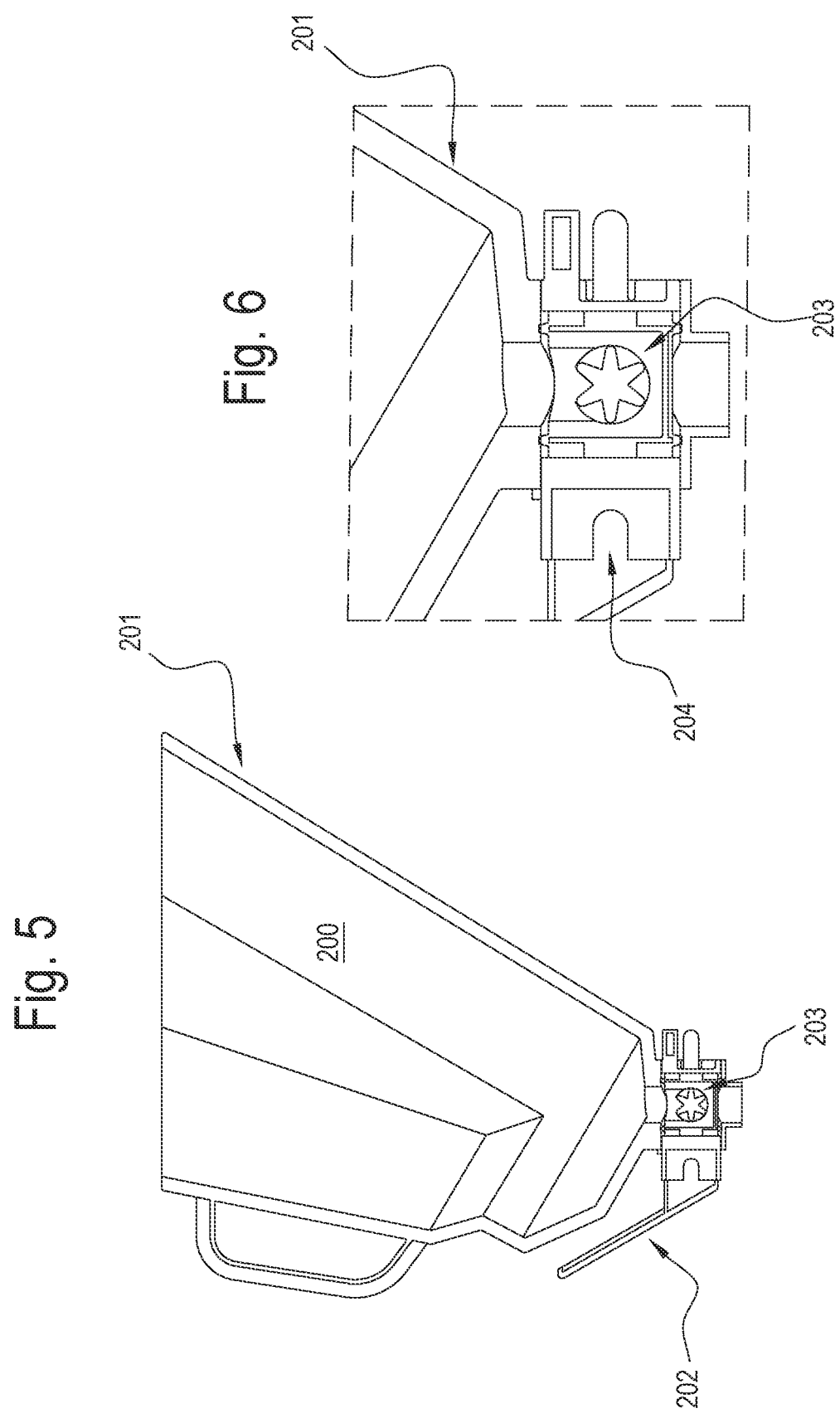

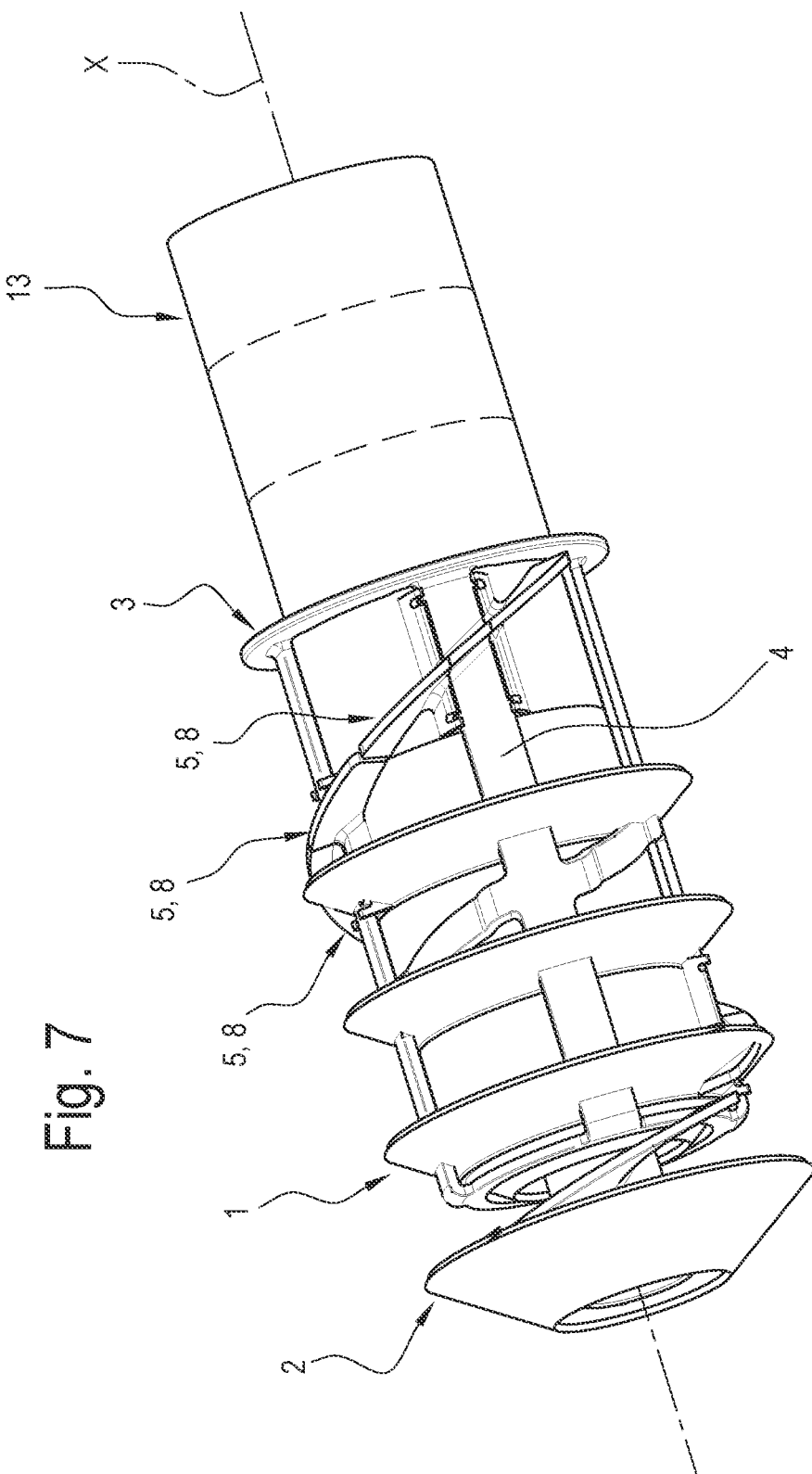

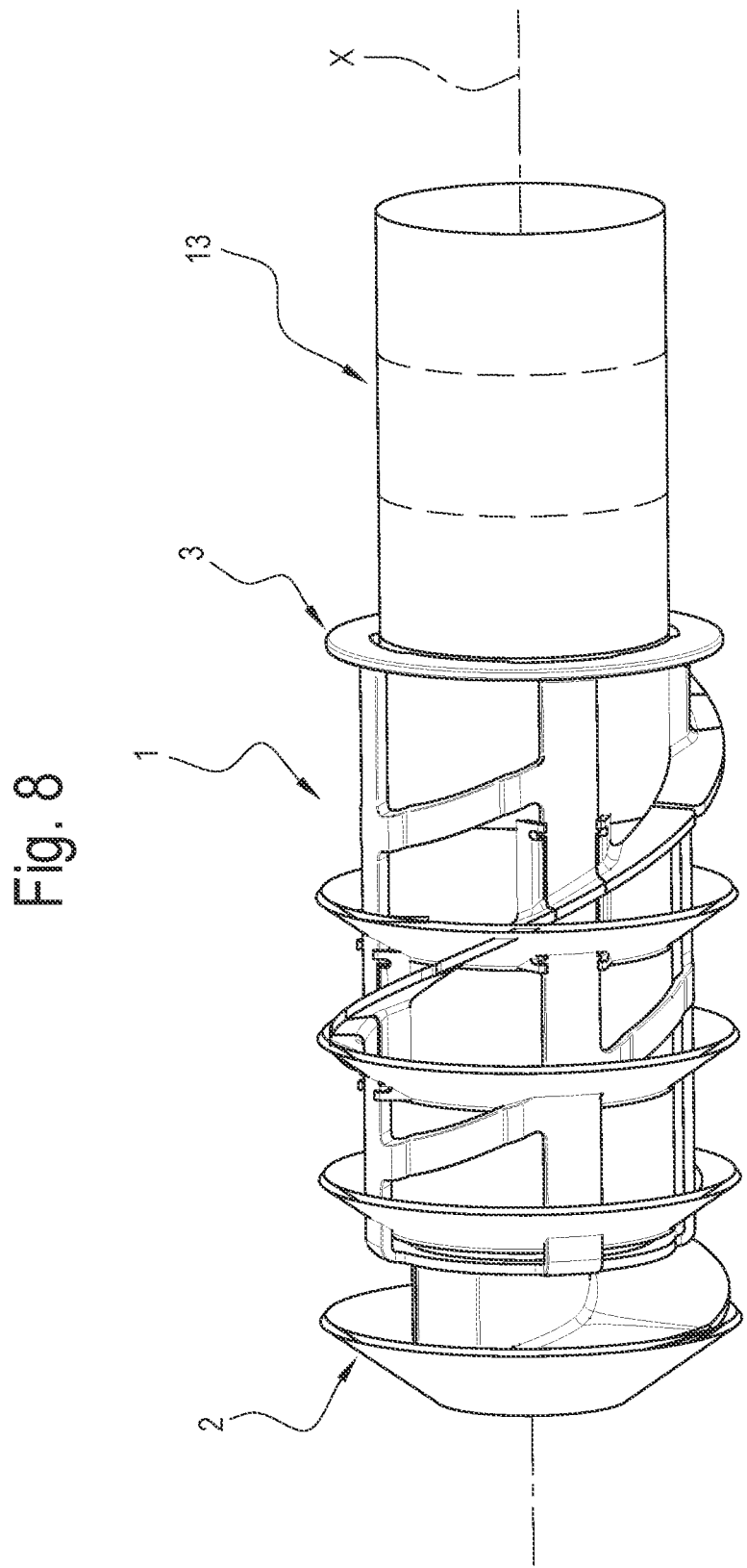

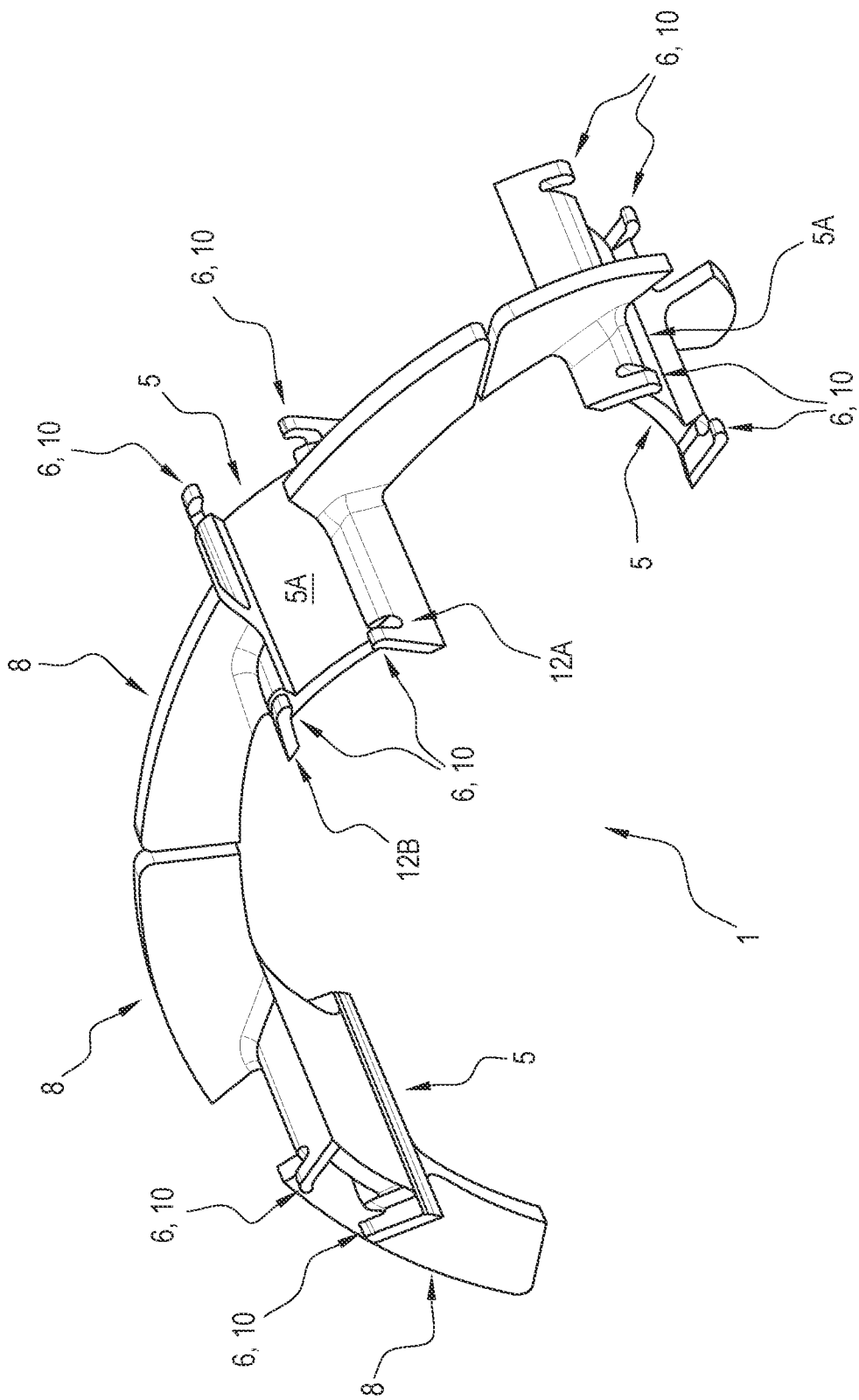

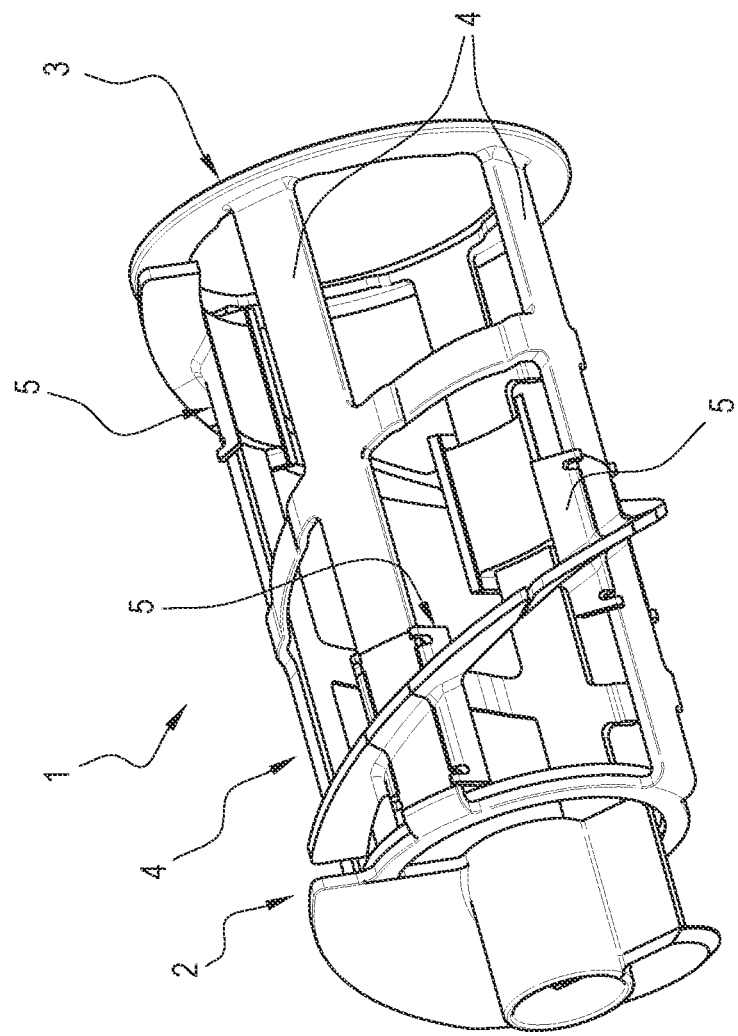

MACHINE FOR MAKING AND DISPENSING LIQUID OR SEMI-LIQUID FOOD PRODUCTS

This application claims priority to Italian Patent Application 102020000009274 filed Apr. 28, 2020, the entirety of which is incorporated by reference herein.

BACKGROUND OF THE INVENTION

This invention relates to a machine for making and dispensing liquid or semi-liquid food products, which are ice cream or cold pastry products or hot food products (pastry and delicatessen).

In particular, in this description reference will be made, by way of example but without limiting the scope of the invention, to machines for making and dispensing products of the granita crushed-ice drink type.

These types of machines usually have a tank, that is to say, a container inside which a cooling cylinder is located on which a stirrer is mounted, adapted to be driven to rotate in order to make the finished product.

A particularly strongly felt need for that type of machine is that of being able to allow easy cleaning and disassembly of the components, as well as good thermal insulation of the product being processed.

SUMMARY OF THE INVENTION

The aim of this invention is, therefore, to make available a machine for making and dispensing liquid or semi-liquid products which meets the above-mentioned requirements.

In particular, the aim of this invention is to make available a machine for making liquid or semi-liquid products in which disassembling the components for cleaning and maintenance is easier and faster.

In addition, one aim of this invention is to make available a machine in which the product being processed is well thermally insulated.

The technical purpose indicated and the aims specified are substantially achieved by a machine for making and dispensing ice cream products, comprising technical features as described herein.

BRIEF DESCRIPTION OF THE DRAWINGS

This and other innovative features of the invention, together with its advantages, will become more apparent from the following description of a preferred embodiment of it, illustrated by way of non-limiting example in the accompanying drawings, in which:

FIGS. 5 and 6 illustrate, in partial cross-section, several details of the machine of FIGS. 1 and 2;

FIGS. 7 and 8 illustrate, in perspective view, a stirrer applied to the machine according to this invention.

FIGS. 9 and 10 illustrate respective details of the stirrer of FIGS. 7 and 8;

DESCRIPTION OF THE PREFERRED EMBODIMENTS

Figure 2:
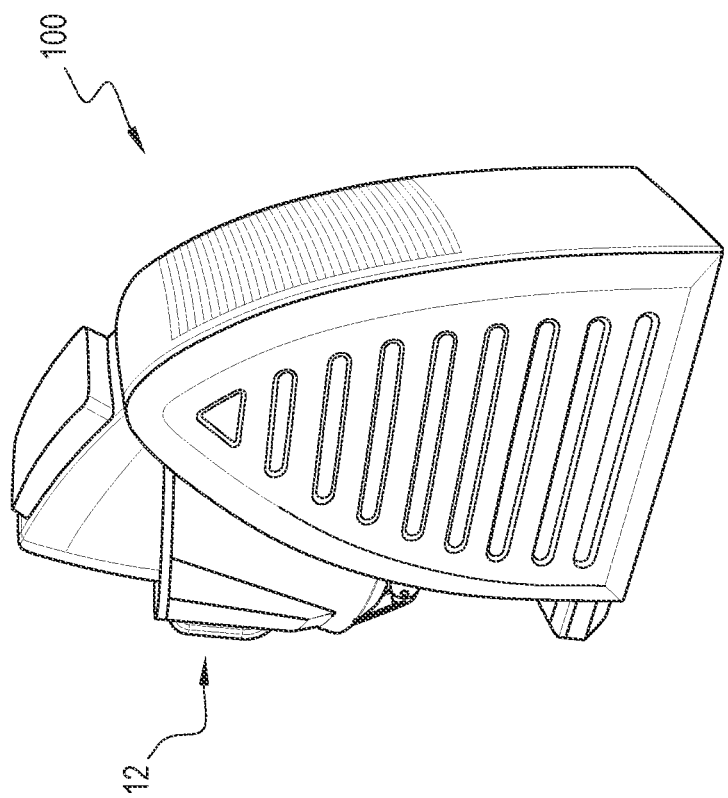
FIGS. 1 and 2 illustrate, in respective schematic perspective views, a machine according to this invention.
Figure 1:
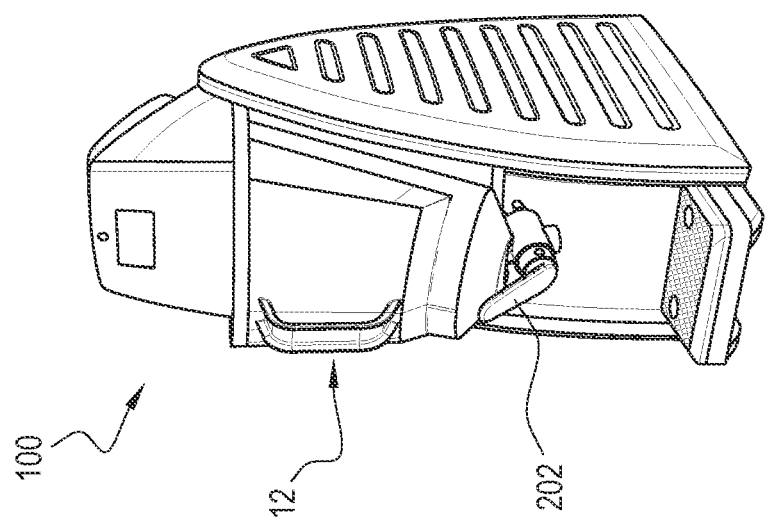

The numeral 1 in FIG. 1 denotes in its entirety a stirrer applicable to the machine 100 according to this invention.

The machine 100 is a machine for making ice cream or cold pastry products such as, for example, granita-making machines or machines for making ice cream, soft ice cream, sorbets, etc.

Preferably, the machine 100 is adapted to make granita, soft ice cream, sorbets, cold creams, etc., or hot products (pastry and delicatessen products).

The machine 100 for making liquid or semi-liquid products, comprises:
- a container 12 for containing liquid or semi-liquid products;
- a thermal treatment cylinder 13 contained inside the container 12;
- a thermal system comprising a heat exchanger 14 associated with the thermal treatment cylinder 13.

The thermal system is preferably of the thermodynamic type.

Preferably, that system is configured to remove heat from the product inside the container 12 through the heat exchanger 14.

The stirrer 1 is located inside the container 12 and is mounted to the outside of the (rotating) thermal treatment cylinder 13.

Indeed it can be seen how that stirrer 1 is located, in use, inside the container 12, in contact with the product being processed.

Preferably, the container 12 for containing liquid or semi-liquid products is inclined (relative to the vertical).

Preferably, the thermal treatment cylinder 13, contained inside the container 12 is inclined (relative to the vertical), that is to say, with its axis inclined.

The term "element inclined" relative to the vertical in this description means that the element forms an angle other than zero relative to the vertical.

Below is a description of further aspects of the machine 100 according to the invention.

The container 12 for containing liquid or semi-liquid products is defined by a first, inside wall 200. That inside wall 200 is made as a single element (preferably made of plastic material).

Moreover, the container 12 for containing liquid or semi-liquid products is defined by a second, outside wall 201.

The second, outside wall 201 is made as a single element (preferably made of plastic material).

Figure 4:
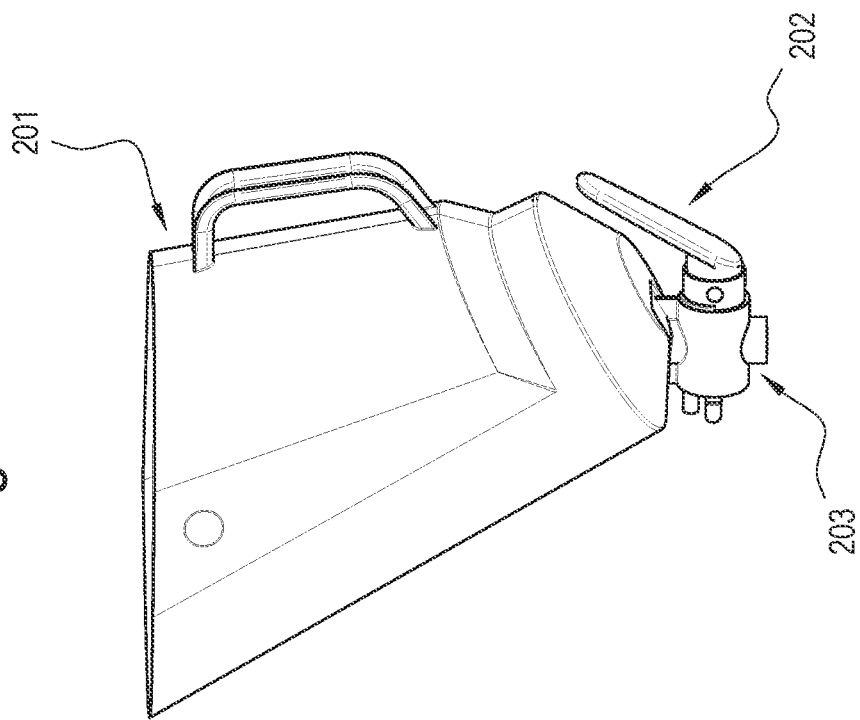
FIGS. 3 and 4 illustrate, in perspective view, several details of the machine of FIGS. 1 and 2.
Figure 3:
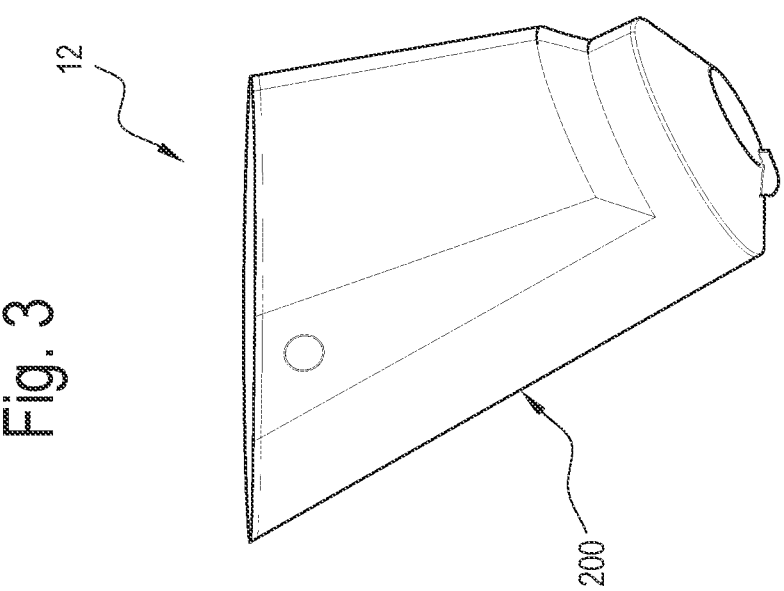

The second, outside wall 201 surrounds the first wall 200 (as is clearly shown in FIGS. 3 and 4).

A gap is formed between the first and second walls.

The gap allows an increase in the thermal resistance (of conduction) to transmission of the heat between the product contained in the container 12 and the outside environment.

In other words, advantageously, there is an improvement in the thermal insulation of the container 12 relative to the surrounding environment.

According to another aspect, the first, inside wall 200 forms part of (or is defined by) a first element, and the second, outside wall 201 forms part of (or is defined by) a second element, the first element being insertable into the second element.

In use, the container 12 has a double wall, as is evident in FIGS. 3 and 4.

The second, outside wall 201 also comprises a lever 202, which can be activated to allow the release of the product contained in the container 12.

The lever 202 is operatively active on a valve 203, adapted to allow opening and closing of the passage of a duct 204 for outflow of the liquid or semi-liquid product from the container 12.

Below is a more in-depth description of the tap, that is to say, the dispenser 210 of the machine 1 according to the invention.

Figure 11:
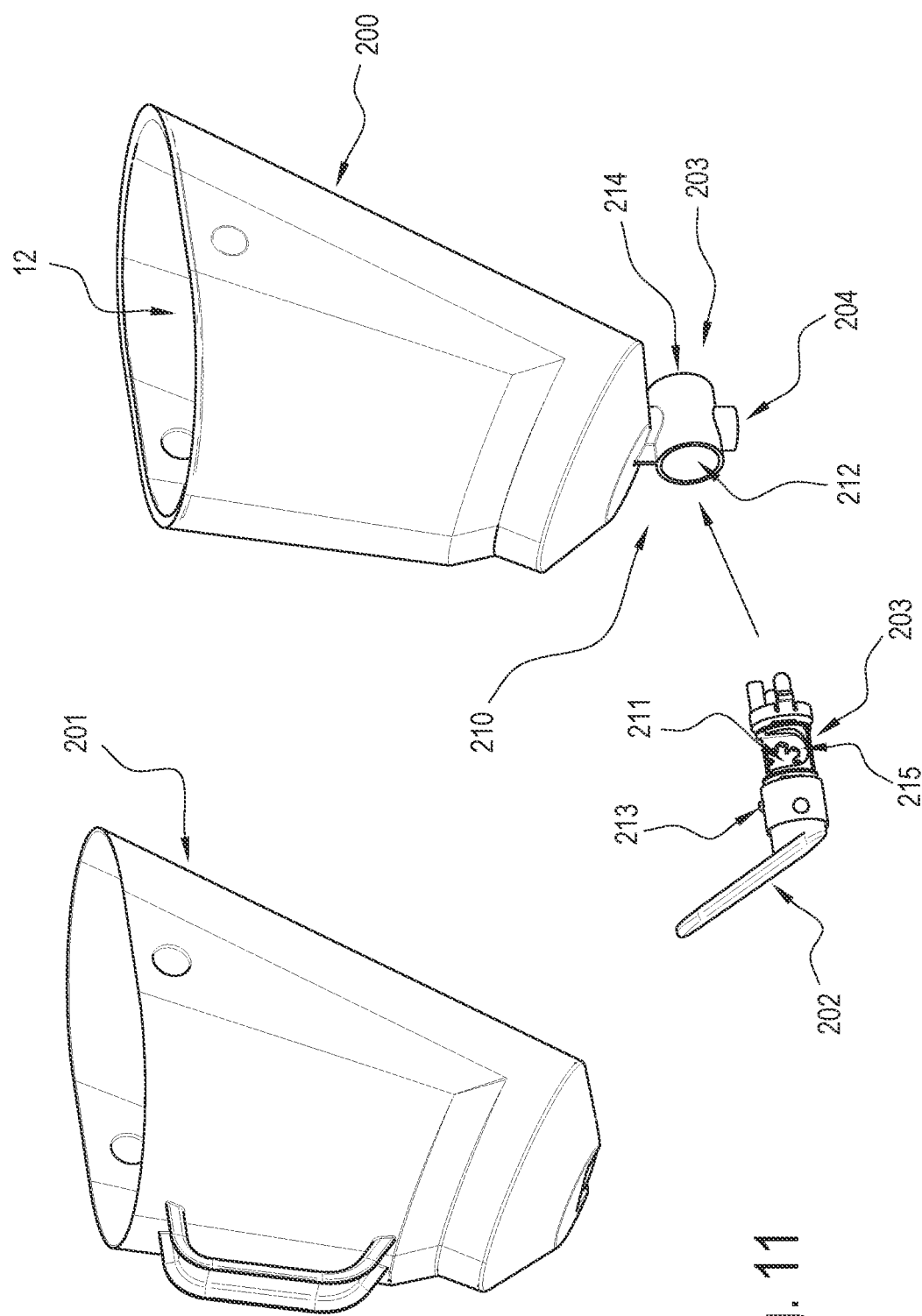
FIG. 11 illustrates further components in a perspective and disassembled view of the machine of FIGS. 1 and 2.

According to the embodiment illustrated in FIG. 11, that dispenser 210 comprises the lever 202, which is connected to a tubular body 213 (which is also part of the dispenser 210).

That tubular body 213 engages in a seat 212 formed in a projection 214 connected to the container 12.

Therefore, the seat 212 is adapted to be engaged by the tubular body 213.

The tubular body 213 is provided with an opening 211, whose function will be described in more detail below.

It should be noticed that moving (preferably rotating) the tubular body 213 allows the opening 211 of the tubular body 213 to be positioned facing towards (in fluid communication with) the space inside the inside wall 200, in which the product being processed is contained.

In other words, the tubular body 213 is movable between a first, open position, in which the opening 211 of the tubular body is facing towards (in fluid communication with) the space inside the inside wall 200 in which the product being processed is contained, and a closed position in which the tubular body 213 blocks the duct 204 (the opening 211 is not directed towards the space inside the container 12).

In this way, moving the tubular body 213 (in particular rotating it) by means of the lever 202 fixed to it allows the product contained inside the container 12 to be dispensed.

It should also be noticed that the opening 211 has an indented shape, provided with peaks 215 and valleys.

That indented shape allows the liquid or semi-liquid food product (ice cream) to be dispensed according to a predetermined shape.

Figure 12B:
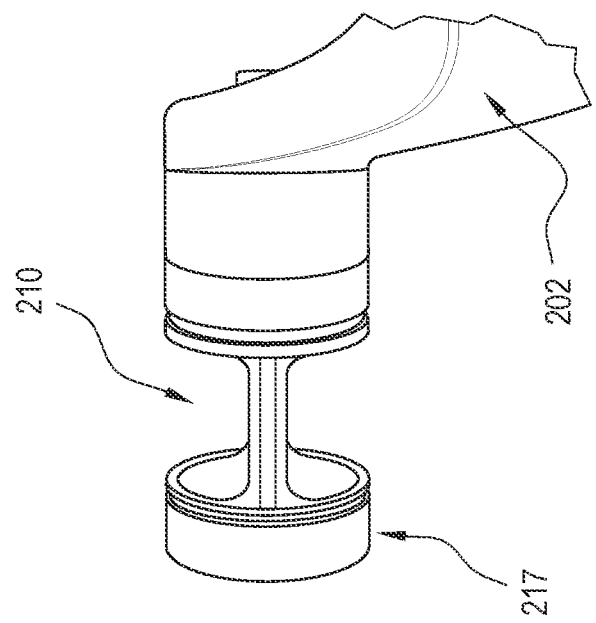
FIGS. 12A and 12B illustrate further components in perspective and disassembled views of the machine of FIGS. 1 and 2, alternatives to those illustrated in FIG. 11.
Figure 12A:
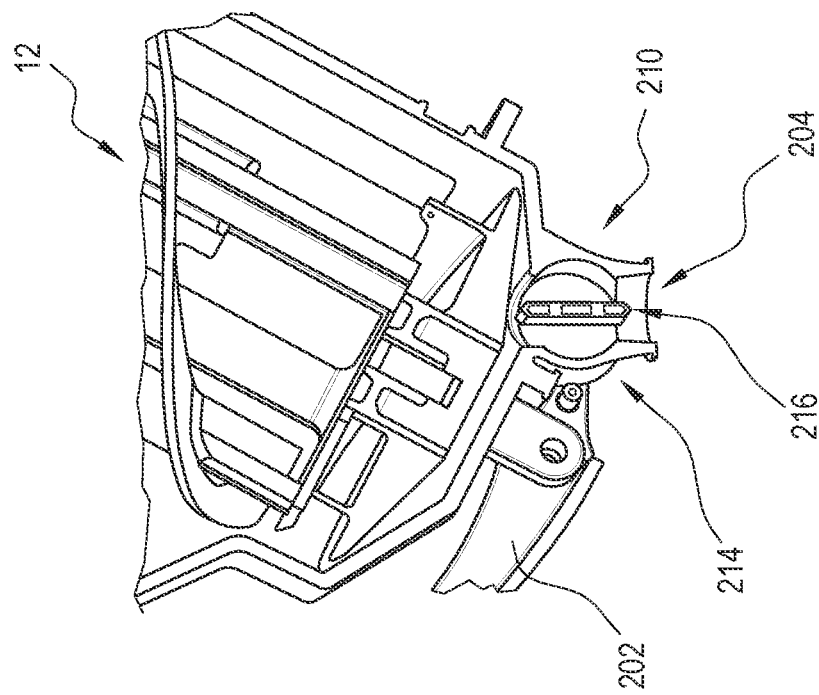

FIGS. 12A and 12B illustrate a further embodiment of the dispenser 210 of the machine 1.

It should be noticed that, according to this embodiment, the dispenser 210 comprises the lever 202, connected to a control body 217. The control body 217 operates a separator element 216 (also part of the dispenser 210), which closes or opens an outlet duct 204 for the liquid or semi-liquid product from the container 12.

The separator element 216 is provided with a protuberance, which allows closing or opening of the outlet duct 204 for the liquid or semi-liquid product from the container 12.

In that case too, rotation of the lever 202 causes the duct 204 to open (and consequent outflow of product from the container 12).

The lever 202 is, preferably, rotatably connected to a projection 214 of the container 12.

According to another aspect, the container 12 is inclined relative to a vertical axis.

More precisely, the container 12 defines a space having an inclination (other than zero) relative to a vertical axis.

It should be noticed that the thermal treatment cylinder 13 previously described is located inside the container 12.

That thermal treatment cylinder 13 comprises, inside it, a heat exchanger (preferably a coil on which a heat-carrying fluid flows).

There follows a description of further aspects, in particular relating to the stirrer 1.

It should be noticed that, preferably, a drive unit is connected to the stirrer 1 for driving it in rotation.

The stirrer 1 allows the product inside the container 12 to be stirred well, allowing the finished product to be made.

In particular, the stirrer 12 also has the task of scraping the outside surface of the cooling cylinder 13, to prevent ice from forming on it and so that the product being processed is treated in the optimum way.

According to another aspect, the stirrer 1 of a machine for making and dispensing ice cream products, rotating about an axis X, which forms the subject matter of this invention, comprises:

a first end element 2 and a second end element 3;

longitudinal elements 4 extending along the axis X between the first end element 2 and second end element 3;

scraping elements 5 which are removably couplable to the longitudinal elements 4, the scraping elements 5 having a portion 8 that is partly helical in shape.

It should be noticed that the longitudinal elements 4 are connected to the first end element 2 and to the second end element 3.

That portion 8 essentially has the task of pushing and moving the product present inside the container 12.

Preferably, those longitudinal elements 4 are bars.

According to another aspect, the scraping elements 5 are provided with first engagement elements 6.

It should be noticed that the portion 8 of the scraping elements 5 substantially defines a helix which is discontinuous, that is to say, extending in discontinuous stretches.

According to another aspect, each scraping element 5 is provided with a plurality of elastically deformable locking elements 10, adapted to allow the scraping element 5 to be held at a predetermined position relative to the longitudinal element 4 when the scraping element 5 has been removably coupled to the longitudinal elements 4.

Preferably, the locking elements 10 are defined by (hook-shaped) projections.

FIG. 10 illustrates the coupling between the scraping elements 5 and the longitudinal elements 4.

As is clearly shown in FIG. 9, it can be seen how the scraping elements 5 have the locking elements 10, in use, facing outwards.

The lower face of the longitudinal elements 4 is, in use, located in contact with the face 5A of the scraping elements 5.

Below is a description of the geometry of the scraping element 5.

Preferably, the longitudinal elements 4 have a prismatic shape.

More precisely, that scraping element 5 has a frustoconical shape: it has two lateral walls 12A and 12B joined by a wall 5A.

The locking elements 10 are formed at the ends of the lateral walls 12A and 12B.

More precisely, each scraping element 5 has four locking elements 10: two at the wall 12A and two at the wall 12B.

According to another aspect, the first end element 2 and the second end element 3 have an annular shape.

According to another aspect, the first end element 2, the second end element 3, the longitudinal elements 4 and the scraping elements 5 are made of plastic material.

It should be noticed that each scraping element 5 is provided with scraping edges 15, adapted to make contact with the outside surface of the treatment cylinder 13 for removing and preventing the formation of an icy layer.

Advantageously, the scraping elements 5 may be removed relatively easily, both for cleaning and for maintenance.

What is claimed is:

1. A machine for making and dispensing liquid or semi-liquid food products, comprising:
   a container for containing liquid or semi-liquid products;
   a thermal treatment cylinder contained inside the container and having an axis that is inclined relative to a vertical direction;
   a stirrer mounted to an outside of the thermal treatment cylinder;
   a thermal system comprising a heat exchanger thermally connected with the thermal treatment cylinder;
   wherein the container includes a first, inside wall a second, outside wall, and an air gap positioned therebetween, the air gap isolated from the liquid or semi-liquid products;
   wherein the first, inside wall is defined by a first element and the second, outside wall is defined by a second element, the first element being removably insertable into the second element to form the air gap.

2. The machine according to claim 1, wherein the thermal treatment cylinder is disposed at an angle to the vertical direction.

3. The machine according to claim 1, wherein the container is provided with a product outlet duct, the machine also comprising a dispensing unit associated with the container, comprising: a lever movable between a position for closing the outlet duct and a position for opening the outlet duct, and a closing body connected to the lever and adapted to be moved by the lever between the position for closing and the position for opening to open or close the outlet duct.

4. The machine according to claim 3, wherein the lever is configured to be moved in rotation.

5. The machine according to claim 1, wherein the stirrer comprises:
   a first end element and a second end element;
   longitudinal elements extending along the axis between the first end element and the second end element;
   scraping elements provided with first engagement elements configured to allow the scraping elements and longitudinal elements to be coupled to each other.

6. The machine according to claim 5, wherein the scraping elements have a helical portion that is partly helical in shape and the first engagement elements are formed on opposite sides of the helical portion.

7. The machine according to claim 5, wherein the longitudinal elements have a prismatic shape.

8. The machine according to claim 5, wherein the first end element and the second end element have an annular shape.

9. The machine according to claim 5, wherein the first end element, the second end element, the longitudinal elements and the scraping elements are made of plastic material.

10. The machine according to claim 5, wherein the first engagement elements are defined by a plurality of elastically deformable locking elements adapted to allow the scraping element to be held at a predetermined position when the scraping element has been removably coupled to the longitudinal elements.

11. The machine according to claim 10, wherein the locking elements are defined by protuberances.

\* \* \* \* \*